US012559582B2

(12) United States Patent
Tritschler et al.

(10) Patent No.: US 12,559,582 B2
(45) Date of Patent: Feb. 24, 2026

(54) POLYACRYLATE POLYMER

(71) Applicant: BASF SE, Ludwigshafen am Rhein (DE)

(72) Inventors: Ulrich Tritschler, Ludwigshafen am Rhein (DE); Clemens Auschra, Ludwigshafen am Rhein (DE); Ralf Knischka, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 812 days.

(21) Appl. No.: 17/415,948

(22) PCT Filed: Dec. 18, 2019

(86) PCT No.: PCT/EP2019/085921

§ 371 (c)(1),
(2) Date: Jun. 18, 2021

(87) PCT Pub. No.: WO2020/127463

PCT Pub. Date: Jun. 25, 2020

(65) Prior Publication Data

US 2022/0064348 A1 Mar. 3, 2022

(30) Foreign Application Priority Data

Dec. 20, 2018 (EP) .................................... 18214832

(51) Int. Cl.
*C08F 220/18* (2006.01)
*C08F 2/06* (2006.01)
*C09D 7/47* (2018.01)

(52) U.S. Cl.
CPC .......... *C08F 220/1804* (2020.02); *C08F 2/06* (2013.01); *C09D 7/47* (2018.01)

(58) Field of Classification Search
CPC ................................................ C08F 220/1804
See application file for complete search history.

(56) References Cited

U.S. PATENT DOCUMENTS

| | | | | |
|---|---|---|---|---|
| 4,075,242 A | | 2/1978 | Rhum et al. | |
| 4,276,432 A | | 6/1981 | Rhum | |
| 4,912,169 A | * | 3/1990 | Whitmire | C08F 220/12 525/227 |
| 5,071,895 A | | 12/1991 | Hughes et al. | |
| 5,444,139 A | * | 8/1995 | Valpey, III | C08F 222/04 526/272 |
| 5,627,239 A | | 5/1997 | Ching et al. | |
| 2020/0078999 A1 | | 3/2020 | Collins et al. | |

FOREIGN PATENT DOCUMENTS

| | | | | | |
|---|---|---|---|---|---|
| CN | 108329421 A | * | 7/2018 | C08F 2/38 |
| EP | 2445944 | | 5/2012 | |
| GB | 896905 A | * | 5/1962 | |
| JP | 05-086124 A | | 4/1993 | |
| JP | 2006-322093 A | | 11/2006 | |
| JP | 2009-052010 A | | 3/2009 | |
| JP | 2021-535852 A | | 12/2021 | |
| WO | 2010/140372 A1 | | 12/2010 | |
| WO | 2010/151865 A1 | | 12/2010 | |
| WO | WO-2017116795 A1 | * | 7/2017 | C07C 57/13 |

OTHER PUBLICATIONS

Machine translation of CN 108329421 A, retrieved May 2024 (Year: 2024).*

Braun et al., "Methods and Techniques for Synthesis, Characterization, Processing, and Modification of Polymers", Polymer Synthesis: Theory and Practice: Fundamentals, Methods, Experiments, 5th Edition, 2005, pp. 93-94.

European Search Report for EP Patent Application No. 18214832.0, Issued on Jul. 10, 2019, 04 pages.

Goldschmidt, et al., "Chapter 2: Coating Materials, 2.1: Raw Materials", BASF Handbook: Basics of Coating Technology, Feb. 12, 2018, pp. 27-30.

International Preliminary Report on Patentability received for PCT Patent Application No. PCT/EP2019/085921, mailed on Jul. 1, 2021, 14 pages.

International Search Report and Written Opinion received for PCT Patent Application No. PCT/EP2019/085921, mailed on Feb. 18, 2020, 16 pages.

Kim et al., "Use of Alcohol as Initiator for Reversible Chain Transfer Catalyzed Polymerization", Macromol. React. Eng., No. 4, Mar. 19, 2010, pp. 272-276.

* cited by examiner

*Primary Examiner* — Michael F Pepitone

(74) *Attorney, Agent, or Firm* — Faegre Drinker Biddle & Reath LLP

(57) ABSTRACT

The present invention relates to a polymer comprising a polyacrylate homo- or co-polymer backbone incorporating at least one benzylic derivative which is covalently bonded to at least one end of the homo- or co-polymer backbone and its use as a flow and levelling agent, additive, dispersant etc.

21 Claims, No Drawings

POLYACRYLATE POLYMER

CROSS-REFERENCE TO RELATED APPLICATIONS

This application is a national stage application (under 35 U.S.C. § 371) of PCT/EP2019/085921, filed Dec. 18, 2019, which claims benefit of European Application No. 18214832.0, filed Dec. 20, 2018, both of which are incorporated herein by reference in their entirety.

FIELD OF THE INVENTION

The present invention relates to a polymer comprising a polyacrylate homo- or co-polymer backbone incorporating at least one benzylic derivative which is bonded to at least one end of the homo- or co-polymer backbone and its use as a flow and levelling agent, additive, dispersant etc.

BACKGROUND OF THE INVENTION

Polymeric materials are known which are effective for dispersing pigments in organic solvents or in water and used to form pigment dispersions of uniform colour that are useful in formulating water borne and solvent borne coating compositions. Such pigment dispersions are widely used, for example, in exterior coatings for automobiles and trucks.

EP 2 445 944 A1 discloses a pigment dispersant comprising a graft copolymer obtained from a monomer mixture consisting of a) 2 to 20 wt. % of vinyl imidazole monomer; b) 55 to 85 wt. % of a macromonomer; and c) amine functional monomers or amide functional monomers or ammonium functional monomers or hydroxyl functional monomers, and d) optionally monomers free of functional groups.

JP 2009-52010 relates to a pigment dispersion containing a dispersant, which in turn contains a (meth)acrylic block copolymer having in one block 5 to 40 mol % of a repeating unit represented by poly (ethylene glycol) ethyl ether (meth) acrylates with 1 to 5 repeating units of ethylene glycol and the other block consisting of repeating units represented by (meth)acrylates having tertiary amino groups. The amino groups are not quaternized. The block copolymer dispersants used for the preparation of these compositions have an amine value between 80 and 150 mg KOH/g.

Further, low molecular weight acrylic polymers are known to be used as additives like dispersing agents, or levelling agents or as a resin component in the coating industry. These low molecular weight acrylic or methacrylic polymers are technically produced by free radical solution polymerization methods in high boiling point aromatic solvents such as xylene. However, the polymers made by this very economic process will exhibit some discoloration, typically a small yellowish tint, which is highly undesirable. In order to overcome these disadvantages various measures have been suggested such as changing the process conditions, addition of stabilizers or conducting the polymerization in non-aromatic solvents. However, all these measures have led to some disadvantages such as high costs and unwanted side effects such as a bad smell which are caused by the additional components, e.g. the stabilizers.

Thus, in view of the almost unlimited range of different technical applications, there remains a growing need for the low molecular weight acrylic polymers.

Hence, it is an object of the presently claimed invention to provide novel polyacrylate homopolymers and copolymers that can be efficiently used as levelling agents, dispersants or as resin components while showing a lower level of discoloration or no discoloration at all.

Surprisingly, it was found that the polyacrylate homopolymers and copolymers that contain moieties that are derived from benzyl alcohol and are preferably bonded to at least one end of the polyacrylate homopolymer or copolymer could be used as levelling agents while showing unexpectedly low levels of discoloration.

SUMMARY OF THE INVENTION

Thus, in a first aspect, the presently claimed invention is directed to a polymer comprising a polyacrylate homo- or copolymer backbone and at least one moiety derived from a compound of the general formula (I), formula (I)

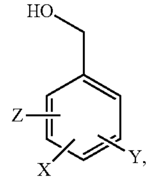

wherein X, Y and Z are independently selected from the group consisting of hydrogen; halogen; substituted or unsubstituted, linear or branched $C_1$-$C_{10}$ alkyl; OR; and C(=O)—OR, wherein R is substituted or unsubstituted, linear or branched $C_1$-$C_{10}$ alkyl, and wherein the at least one moiety derived from the compound of the general formula (I) is covalently bonded to at least one of the ends of the polyacrylate backbone.

In a second aspect, the presently claimed invention is directed to a method of preparing a polymer comprising at least the steps of:

a) polymerizing a mixture comprising at least one acrylate monomer of the general formula (II), formula (II)

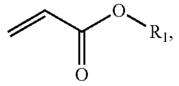

wherein $R_1$ is selected from the group consisting of substituted or unsubstituted, linear or branched $C_1$-$C_{22}$ alkyl or substituted or unsubstituted aryl;

in the presence of at least one free radical forming initiator and the at least one compound of the general formula (I)

formula (I)

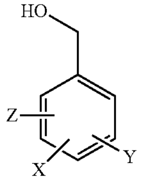

wherein X, Y and Z are independently selected form the group consisting of hydrogen; halogen; substituted or unsubstituted, linear or branched $C_1$-$C_{10}$ alkyl; OR, and C(═O)—OR, wherein R is substituted or unsubstituted, linear or branched $C_1$-$C_{10}$ alkyl.

In a third aspect, the presently claimed invention is directed to a liquid composition in the form of a dispersion comprising, the polymer according to the presently claimed invention and a fine particulate solid material selected from the group consisting of pigments and fillers, and a liquid diluent.

In a fourth aspect, the presently claimed invention is directed to the use of the polymer prepared according to the presently claimed invention as an additive in coatings, paints, inks and adhesives; as a dispersant for fine particulate solid material selected from the group consisting of pigments and fillers; as flow and levelling agent or surface additive; as resin component in coatings, paints, inks, and adhesives.

DETAILED DESCRIPTION OF THE INVENTION

Before the present invention is described, it is to be understood that the terminology used herein is not intended to be limiting, since the scope of the present invention will be limited only by the appended embodiments.

If hereinafter a group is defined to comprise at least a certain number of embodiments, this is meant to also encompass a group which preferably consists of these embodiments only. Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms 'first', 'second', 'third' or '(A)', '(B)' and '(C)' or '(a)', '(b)', '(c)', '(d)', 'i', 'ii' etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

In one embodiment, the presently claimed invention is directed to a polymer comprising a polyacrylate homo- or copolymer backbone and at least one moiety derived from a compound of the general formula (I), formula (I)

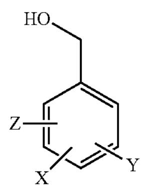

wherein X, Y and Z are independently selected from the group consisting of hydrogen; halogen; substituted or unsubstituted, linear or branched $C_1$-$C_{10}$ alkyl; OR; and C(═O)—OR, wherein R is substituted or unsubstituted, linear or branched $C_1$-$C_{10}$ alkyl, and wherein the at least one moiety derived from the compound of the general formula (I) is covalently bonded to at least one of the ends of the polyacrylate backbone.

In a preferred embodiment, the presently claimed invention is directed to a polymer comprisesing a polyacrylate homo- or copolymer backbone and at least one moiety derived from a compound of the general formula (I), formula (I)

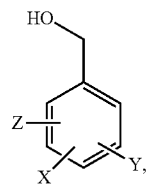

wherein X, Y and Z are independently selected from the group consisting of hydrogen; halogen; substituted or unsubstituted, linear or branched $C_1$-$C_{10}$ alkyl and OR; wherein R is substituted or unsubstituted, linear or branched $C_1$-$C_{10}$ alkyl, and wherein the at least one moiety derived from the compound of the general formula (I) is covalently bonded to at least one of the ends of the polyacrylate backbone.

In another preferred embodiment, the presently claimed invention is directed to a polymer comprising a polyacrylate homo- or copolymer backbone and at least one moiety derived from a compound of the general formula (I)

formula (I)

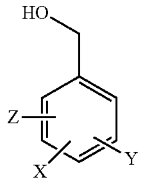

wherein X, Y and Z are independently selected from the group consisting of hydrogen; halogen; substituted or unsubstituted, linear or branched $C_1$-$C_{10}$ alkyl; wherein the at least one moiety derived from the compound of the general formula (I) is covalently bonded to at least one of the ends of the polyacrylate backbone.

In yet another preferred embodiment, the presently claimed invention is directed to a polymer comprising a polyacrylate homo- or copolymer backbone and at least one moiety derived from a compound of the general formula (I)

formula (I)

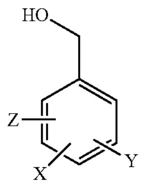

wherein X, Y and Z are independently selected from the group consisting of hydrogen and halogen, wherein the at least one moiety derived from the compound of the general formula (I) is covalently bonded to at least one of the ends of the polyacrylate backbone.

In another preferred embodiment, the presently claimed invention is directed to a polymer comprising a polyacrylate copolymer backbone and at least one moiety derived from a compound of the general formula (I), formula (I)

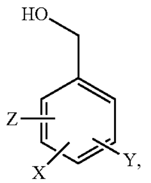

wherein X, Y and Z are hydrogen; wherein the at least one moiety derived from the compound of the general formula (I) is covalently bonded to at least one of the ends of the polyacrylate backbone.

In a preferred embodiment the compound of the general formula (I) is formula (I)

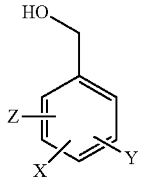

wherein X, Y and Z are independently selected from the group consisting of hydrogen; halogen; substituted or unsubstituted, linear or branched $C_1$-$C_{10}$ alkyl; OR; and C(═O)—OR, wherein R is substituted or unsubstituted, linear or branched $C_1$-$C_{10}$ alkyl.

In a preferred embodiment, X is selected from the group consisting of hydrogen; halogen; substituted or unsubstituted, linear or branched $C_1$-$C_{10}$ alkyl; OR; and C(═O)—OR, wherein R is substituted or unsubstituted, linear or branched $C_1$-$C_{10}$ alkyl; more preferably X is selected from the group consisting of hydrogen; halogen; substituted or unsubstituted, linear or branched $C_1$-$C_{10}$ alkyl and OR, wherein R is substituted or unsubstituted, linear or branched $C_1$-$C_{10}$ alkyl. Even more preferably X is selected from the group consisting of hydrogen; halogen; substituted or unsubstituted, linear or branched $C_1$-$C_{10}$ alkyl. Most preferably, X is selected from the group consisting of hydrogen and halogen. In particular, X is hydrogen.

In a preferred embodiment, Y is selected from the group consisting of hydrogen; halogen; substituted or unsubstituted, linear or branched $C_1$-$C_{10}$ alkyl; OR; and C(═O)—OR, wherein R is substituted or unsubstituted, linear or branched $C_1$-$C_{10}$ alkyl; more preferably Y is selected from the group consisting of hydrogen; halogen; substituted or unsubstituted, linear or branched $C_1$-$C_{10}$ alkyl and OR, wherein R is substituted or unsubstituted, linear or branched $C_1$-$C_{10}$ alkyl. Even more preferably, Y is selected from the group consisting of hydrogen; halogen; and substituted or unsubstituted, linear or branched $C_1$-$C_{10}$ alkyl. Most preferably, Y is selected from the group consisting of hydrogen and halogen. In particular, Y is hydrogen.

In a preferred embodiment, Z is selected from the group consisting of hydrogen; halogen; substituted or unsubstituted, linear or branched $C_1$-$C_{10}$ alkyl; OR; and C(═O)—OR, wherein R is substituted or unsubstituted, linear or branched $C_1$-$C_{10}$ alkyl; more preferably Z is selected from the group consisting of hydrogen; halogen; and substituted or unsubstituted, linear or branched $C_1$-$C_{10}$ alkyl and OR, wherein R is substituted or unsubstituted, linear or branched $C_1$-$C_{10}$ alkyl. Even more preferably Z is selected from the group consisting of hydrogen; halogen; and substituted or unsubstituted, linear or branched $C_1$-$C_{10}$ alkyl. Most preferably, Z is selected from the group consisting of hydrogen and halogen. In particular, Z is hydrogen.

In a preferred embodiment, X, Y and Z are each halogen which is preferably selected from the group consisting of F, Cl, Br and I. More preferably halogen is selected from Cl and Br, most preferably halogen is Cl.

Within the context of the presently claimed invention, the term "alkyl", as used herein, refers to an acrylic saturated aliphatic groups, including linear or branched alkyl saturated hydrocarbon radicals denoted by a general formula $C_nH_{2n+1}$ and wherein n is the number of carbon atoms such as 1, 2, 3, 4 etc.

In a preferred embodiment, X, Y and Z are $C_1$-$C_{10}$ alkyl, more preferably $C_1$-$C_6$ alkyl, even more preferably $C_1$-$C_5$ alkyl, most preferably $C_1$-$C_3$ alkyl, particularly preferably $C_1$-$C_2$ alkyl.

In a preferred embodiment, X, Y and Z are linear $C_1$-$C_{10}$ alkyl selected from the group consisting of methyl, ethyl, propyl, butyl, pentyl, hexyl, heptyl, octyl, nonyl and decyl; more preferably selected from the group consisting of methyl, ethyl, propyl, butyl, pentyl and hexyl; even more preferably selected from the group consisting of methyl, ethyl, propyl, butyl and pentyl; most preferably selected from the group consisting of methyl, ethyl and propyl; and in particular selected from methyl and ethyl.

In a preferred embodiment, X, Y and Z are branched $C_1$-$C_{10}$ alkyl selected from the group consisting of isopropyl, iso-butyl, neo-pentyl, 2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl and iso-decyl, more preferably selected from the group consisting of isopropyl, iso-butyl, neo-pentyl and 2-ethylhexyl; and most preferably selected from isopropyl and iso-butyl.

In a preferred embodiment, substituted, linear or branched, $C_1$-$C_{10}$ alkyl refers to a linear or branched saturated hydrocarbon group having $C_1$-$C_{10}$ carbon atoms substituted with hydroxy, alkoxy, aryl, substituted aryl wherein substitution selected from halogen, hydroxy, amine, alkyl, nitro, cyano, etc.

In a preferred embodiment, X, Y and Z are substituted linear $C_1$-$C_{10}$ alkyl selected from the group consisting of hydroxy methyl, hydroxy ethyl, hydroxy, propyl, hydroxy isopropyl, hydroxy butyl, hydroxy isobutyl, hydroxy tert-butyl, 2-hydroxy-hexyl, 2,3-dihydroxy-hexyl, 3-hydroxy-2-methoxyhexyl, 2-hydroxy-heptyl, 2,3-dihydroxy-heptyl, 3-hydroxy-2-methoxyheptyl, 2,3-di-methoxyheptyl, 2-ethoxy-3-methoxy-heptyl, 2-isopropoxy-3-methoxy-heptyl, 2,3-diiso-propoxyheptyl, 3-hydroxy-2-methoxyoctyl, 2,3-dimethoxyoctyl, 2-ethoxy-3-methoxy-octyl, 2-isopropoxy-3-methoxy-octyl, 2,3-diisopropoxyoctyl, 3-hydroxy-5-methoxyoctyl, 2,5-di-methoxyoctyl, 5-ethoxy-3-methoxy-octyl, 5-isopropoxy-5-methoxy-octyl, 4,7-diisopropoxyoc-tyl, 3-hydroxy-2-methoxynonayl, 2,3-dimethoxynonayl, 2-ethoxy-3-methoxy-nonayl, 2-isopropoxy-3-methoxy-nonayl, 2,3-diisopropoxynonayl, 2-phenyl-hexyl, 2,3-diphenyl-hexyl, 3-hydroxy-2-phenyl hexyl, 2-phenyl-heptyl and 2,3-diphenyl-heptyl.

In a preferred embodiment, X, Y and Z are OR; wherein R is substituted or unsubstituted, linear or branched $C_1$-$C_{10}$ alkyl. In a preferred embodiment, the OR is selected from the group consisting of methoxy, ethoxy, propoxy, isopropoxy, butoxy, pentoxy, hexoxy, heptoxy, octoxy, nonoxy, decyloxy, isobutoxy, tert-butoxy, isopentoxy, neopentoxy, methyl hexoxy, ethyl hexoxy, propyl hexoxy and isoproyl methylnonoxy.

In a preferred embodiment, X, Y and Z are C(═O)—OR; wherein R is substituted or unsubstituted, linear or branched $C_1$-$C_{10}$ alkyl as defined above.

In a preferred embodiment, the compound of the general formula (I) is selected form the group consisting of benzyl alcohol, o-tolylmethanol, m-tolylmethanol, p-tolylmethanol, (2,4-dimethylphenyl)methanol, (3,4-dimethylphenyl)methanol, (2,3-dimethylphenyl)methanol, (2,6-dimethylphenyl) methanol, [4-(hydroxymethyl)phenyl]methanol, [3-(hydroxymethyl)phenyl]methanol, [2-(hydroxymethyl)phenyl] methanol, (3-chlorophenyl)methanol, (4-chlorophenyl) methanol, (2-chlorophenyl)methanol, (3,5-dichlorophenyl) methanol, (2,3-dichloro-phenyl)methanol, (3,6-dichlorophenyl)methanol, (4,5-dichlorophenyl)methanol, (2,6-dichlo-rophenyl)methanol, (3-chloro-5-methoxy-phenyl)methanol, (2-chloro-5-methoxy-phenyl) methanol, (3-chloro-4-methoxy-phenyl)methanol, (4-chloro-2-methoxy-phenyl)methanol, (3-methoxyphenyl)methanol, (2-methoxyphenyl)methanol, (4-methoxyphenyl)methanol, (2,3-dimethoxyphenyl)methanol, (2,4-dimethoxyphenyl) methanol, (2,5-dimethoxy-phenyl)methanol, (2,6-dimethoxyphenyl)methanol, (3,4-dimethoxyphenyl)methanol, (3,5-di-methoxyphenyl)methanol and (3,6-dimethoxyphenyl)methanol.

More preferably, the compound of the general formula (I) is selected from the group consisting of benzyl alcohol, o-tolylmethanol, p-tolylmethanol, [3-(hydroxymethyl)phenyl]methanol, (2-methoxyphenyl)methanol, and (4 methoxyphenyl)methanol.

Most preferably, the compound of general formula (I) is benzyl alcohol.

In a particular preferred embodiment, the presently claimed invention is directed to a polymer comprising a polyacrylate homo- or copolymer backbone and at least one moiety derived from benzyl alcohol, and wherein the at least one moiety derived from benzyl alcohol is covalently bonded to at least one of the ends of the polyacrylate backbone.

In another preferred embodiment, the compound of the general formula (I) is a compound having a melting point less than 180° C., more preferably the melting point of the compound of formula (I) is less than 150° C., even more preferably the melting point of the compound of formula (I) is less than 100° C., most preferably the melting point of the compound of formula (I) is less than 80° C. and in particular the melting point of compound of formula (I) is less than 40° C.

In a preferred embodiment the polyacrylate homopolymer backbone is obtained by polymerizing a mixture comprising at least one acrylate monomer of general formula (II), formula (II)

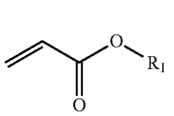

wherein $R^1$ is selected from the group consisting of substituted or unsubstituted, linear or branched $C_1$-$C_{22}$ alkyl or substituted or unsubstituted aryl.

In a preferred embodiment, $R_1$ refers to a substituted or unsubstituted, branched or linear saturated hydrocarbon group having $C_1$-$C_{22}$ carbon atoms, more preferably $C_1$-$C_{10}$ carbon atoms, even more preferably $C_1$-$C_8$ carbon atoms, most preferably $C_1$-$C_5$ carbon atoms, in particular $C_1$-$C_4$ carbon atoms.

In a preferred embodiment, $R_1$ is unsubstituted linear $C_1$-$C_{22}$ alkyl selected from the group consisting of methyl, ethyl, propyl, butyl, pentyl, hexyl, heptyl, octyl, nonyl and decyl, undecyl, dodecyl, tridecyl, tetradecyl, pentadecyl, hexadecyl, heptadecyl, octadecyl, nonadecyl, eicosyl, henicosyl, and docosyl; more preferably selected from the group consisting of methyl, ethyl, propyl, butyl, pentyl, hexyl, heptyl, octyl, nonyl and decyl; even more preferably selected from the group consisting of methyl, ethyl, propyl, butyl and pentyl; most preferably selected from the group consisting of methyl, ethyl and propyl; and in particular selected from methyl and ethyl.

In a preferred embodiment, $R_1$ is unsubstituted branched $C_1$-$C_{22}$ alkyl selected from the group consisting of isopropyl, iso-butyl, neo-pentyl, 2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl, iso-decyl, iso-dodecyl, iso-tetradecyl, iso-hexadecyl, iso-octadecyl and iso-eicosyl, more preferably selected from the group consisting of isopropyl, iso-butyl, neo-pentyl, 2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl and iso-decyl; and most preferably selected from isopropyl, iso-butyl, neo-pentyl and 2-ethylhexyl.

In a preferred embodiment, $R_1$ refers to a branched or linear saturated hydrocarbon group having $C_1$-$C_{22}$ carbon atoms substituted with hydroxy, alkoxy, unsubstituted aryl, substituted aryl, wherein the substituents are selected from the group consisting of halogen, hydroxy, amine, alkyl, nitro and cyano, more preferably branched or linear saturated hydrocarbon group having $C_1$-$C_{10}$ carbon atoms substituted with hydroxy, alkoxy, unsubstituted aryl, substituted aryl, wherein the substituents are selected from the group consisting of halogen, hydroxy, amine, alkyl, nitro and cyano; even more preferably branched or linear saturated hydrocarbon group having $C_1$-$C_6$ carbon atoms substituted with hydroxy, alkoxy, unsubstituted aryl, substituted aryl, wherein from the substituents are selected from the group consisting of halogen and hydroxy; most probably branched or linear saturated hydrocarbon group having $C_1$-$C_5$ carbon atoms substituted with hydroxy, unsubstituted aryl, substituted aryl, wherein the substituents are selected from the group consisting of halogen and hydroxy.

In a preferred embodiment, $R_1$ is substituted, branched $C_1$-$C_{22}$ alkyl selected from the group consisting of 2-hydroxylethyl, 2-hydroxylpropyl, 3-hydroxylpropyl, 4-hydroxylbutyl, 2-(2-eth-oxyethoxy)ethyl and 2-phenoxyethyl.

In another preferred embodiment, the at least one acrylate monomer of general formula (II) is selected from the group consisting of methyl acrylate, ethyl acrylate, 2 hydroxyethyl acrylate, 2-hydroxyisopropyl acrylate, propyl acrylate, n-butyl acrylate, octyl acrylate, isobutyl acrylate, tert-butyl acrylate, 4-hydroxybutyl acrylate, octyl acrylate, 2-ethylhexyl acrylate, 2-methoxyethyl acrylate, 2-ethoxyethyl acrylate, 2-butoxyethyl acrylate, 2-(2-ethoxyethoxy)ethyl acrylate, 2-(2-butoxyethoxy)ethyl acrylate 2-phenoxyethyl acrylate, isobornyl acrylate, isodecyl acrylate, lauryl acrylate, stearyl acrylate, behenyl acrylate, tetrahydrofurfuryl acrylate, isophoryl acrylate, 2-(dimethylamino)ethyl acrylate, 2-(diethylamino)ethyl acrylate and polyethoxylated acrylate.

In a preferred embodiment, the at least one acrylate monomer of general formula (II) is not a benzyl acrylate monomer.

In a preferred embodiment, the at least one acrylate monomer is selected from the group consisting of 2-(perfluorohexyl)ethyl acrylate, 2-(perfluoroethyl)ethyl methacrylate and 2-(Perfluorobutyl)ethyl methacrylat In a preferred embodiment, the at least one acrylate monomer is a silicone modified acrylate.

In a preferred embodiment, the polyacrylate copolymer backbone is obtained by polymerizing a mixture comprising at least one acrylate monomer of general formula (II) and at least one ethylenically unsaturated monomer which is different from the acrylate monomer of general formula (II).

In a preferred embodiment the at least one ethylenically unsaturated monomer is selected from the group consisting of (meth)acrylic esters of general formula (IIIa), acrylamides of general formula (IIIb), acrylonitrile, methacrylonitrile, acrylic acid, methacrylic acid, vinylcaprolactam, N-acryloyl-N'-methylpiperazine, N-acryloyl-N'-ethylpiperazine, N-acryloyl-N'-propylpiperazine, styrene, substituted styrene, α-methylstyrene, vinyl toluene, vinyl esters, vinylidene halides, and α-olefins.

In a preferred embodiment, the compound of the general formula (IIIa) is formula (IIIa)

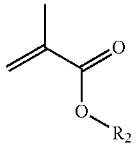

wherein $R_2$ is selected from the group consisting of substituted or unsubstituted, linear or branched $C_1$-$C_{22}$ alkyl and substituted or unsubstituted aryl.

In another preferred embodiment, the compound of the general formula (IIIb) is formula (IIIb)

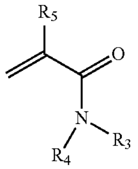

wherein $R_3$, $R_4$ and $R_5$ are independently selected from the group consisting of hydrogen, substituted or unsubstituted, linear or branched $C_1$-$C_{22}$ alkyl and substituted or unsubstituted aryl.

In a preferred embodiment, $R_2$ is selected from the group consisting of substituted or unsubstituted, linear or branched $C_1$-$C_{22}$ alkyl and substituted or unsubstituted aryl, more preferably $R_2$ is selected from the group consisting of unsubstituted, linear or branched $C_1$-$C_{22}$ alkyl and substituted or unsubstituted aryl, most preferably unsubstituted, linear or branched $C_1$-$C_{10}$ alkyl and substituted or unsubstituted aryl and in particular unsubstituted, linear or branched $C_1$-$C_{10}$ alkyl.

In another preferred embodiment, the compounds of formula (IIIa) are (meth)acrylic esters of linear alcohols having 1 to 22 carbon atoms selected from the group consisting of methyl (meth)acrylate, ethyl (meth)acrylate, n-butyl (meth) acrylate, tert-butyl (meth)acrylate, n-hexyl (meth)acrylate, isobutyl (meth)acrylate, isopentyl (meth)acrylate, lauryl (meth)acrylate, 2-ethylhexyl (meth)acrylate, stearyl (meth) acrylate, behenyl (meth)acrylate, isodecyl (meth)acrylate, 2-propylheptyl (meth)acrylate, 3,5,5-trimethyl-1-hexyl (meth)acrylate, nonanyl (meth)acrylate, 2-propylheptyl (meth)acrylate, 2-isopropyl-5-methyl-hexyl (meth)acrylate, tridecyl (meth)acrylate, heptadecyl (meth)acrylate, and heneicosanyl (meth)acrylate; and aryl (meth)acrylic esters whose aryl ring, without possible additional substituents, contains 5 to 12 carbon atoms, such as phenyl acrylate; and aralkyl (meth)acrylic esters whose aralkyl radical, without possible additional substituents on the aryl radical, contains 6 to 12, preferably 7 to 12, carbon atoms, such as benzyl methacrylate.

It is possible for the aryl radicals of the aryl (meth)acrylic esters and of the aralkyl (meth)acrylic esters in each case to be unsubstituted or to be substituted up to four times, such as, for example, 4-methylphenyl methacrylate; and (meth) acrylic acid esters of monoether monoalcohol or polyether monoalcohols, such as ethers, polyethylene glycols, polypropylene glycols, polybutylene glycols or mixed polyalkylene glycols having 4 to 80 carbon atoms and a statistical, a block or a gradient distribution of the different monomers along the chain, such as, for example, tetrahydrofurfuryl (meth)acrylate, di(ethylene glycol) methyl ether (meth)acrylate, furfuryl (meth)acrylate, 2-butoxyethyl (meth)acrylate, 2-ethoxyethyl (meth)acrylate, allyloxyethyl (meth)acrylate, 1-ethoxybutyl (meth)acrylate, ethyltriglycol (meth)acrylate, butyldiglycol (meth)acrylate, poly(propylene glycol) methyl ether (meth)acrylate and poly(ethylene glycol) alkyl ether (meth)acrylate, wherein alkyl stands for a linear or branched alkyl residue having 1 to 22, preferably 1 to 15, more preferably 1 to 13, even more preferably 1 to 10 carbon atoms and most preferably 1 to 7 carbon atoms.

In a preferred embodiment, $R_3$, $R_4$ and $R_5$ are independently selected from the group consisting of hydrogen, substituted or unsubstituted, linear or branched $C_1$-$C_{22}$ alkyl and substituted or unsubstituted aryl, more preferably selected from the group consisting of hydrogen, unsubstituted, linear or branched $C_1$-$C_{22}$ alkyl and substituted or unsubstituted aryl, even more preferably selected from the group consisting of hydrogen, unsubstituted, linear or branched $C_1$-$C_{22}$ alkyl and unsubstituted aryl, most preferably selected from the group consisting of hydrogen, unsubstituted, linear or branched $C_1$-$C_{10}$ alkyl and unsubstituted aryl; and in particular preferably $R_3$, $R_4$ and $R_5$ are independently hydrogen and methyl.

The representative examples of the compound of formula (IIb) include methacrylamide, N-ethylacrylamide, N,N'-methylethylacrylamide, N,N'-diethylacrylamide, N-dimethylaminopropyl methacrylamide, N-isopropylacrylamide, N-isopropylmethacrylamide, 2-carboxylisopropylacrylamide, N-methylisopropylacrylamide, N-propylacrylamide, N-propylmethacrylamide and N-(L)-(1-hydroxymethyl)propylmethacrylamide.

In a preferred embodiment, the at least one acrylate monomer is selected from the group consisting of 2-(perfluorohexyl)ethyl methacrylate, 2-(perfluoroethyl)ethyl methacrylate, and 2-(Perfluorobutyl)ethyl methacrylate.

In a preferred embodiment, the at least one acrylate monomer is a terminal reactive polydimethysiloxane methacrylate macromonomer. The terminal reactive polysiloxane compound has at least one polymerizable unsaturated group such as an acryloxy group, methacryloxy group, vinyl group, propenyl group, styryl group, ethynyl group, maleate group or acrylamide group. The terminal reactive polysiloxane may be prepared by a known method, or it is commercially available. Examples of commercial products are Silaplane FM-0711, FM-0721, FM-0725, FM-0511, FM-0521, FM-0525, TM-0701, TM-0701T.

In a preferred embodiment the at least one moiety that is derived from a compound of the general formula (I) is present in an amount in the range from ≥1.5 wt. % to ≤30 wt. %, more preferably in the range from ≥1.5 wt. % to ≤20 wt. %, even more preferably in the range from ≥1.5 wt. % to ≤15 wt. %, most preferably in the range from ≥2 wt. % to ≤10 wt. % and particular preferably in the range from ≥3 wt. % to ≤10 wt. %, based on the overall weight of the polymer.

In a preferred embodiment, the polymer has a number average molecular weight $M_n$ in the range from ≥500 g/mol to ≤100,000 g/mol as measured by GPC, more preferably in the range from ≥500 g/mol to ≤80,000 g/mol, even more preferably in the range from ≥1,000 g/mol to ≤50,000 g/mol, most preferably in the range from ≥1,000 g/mol to ≤30,000 g/mol and in particular in the range from ≥1,000 g/mol to ≤10,000 g/mol$^{-1}$ as measured by GPC.

In a preferred embodiment, the polyacrylate copolymer backbone that contains moieties derived from a compound of formula (I) is a polyacrylate co-polymer incorporating 9 wt. % benzyl alcohol, based on the overall weight of the polymer, having a number average molecular weight in the range of ≥1,000 g/mol to ≤3,000 g/mol$^{-1}$ as measured by GPC.

In a preferred embodiment, the polyacrylate copolymer backbone that contains moieties derived from a compound of formula (I) is a polyacrylate co-polymer incorporating 8 wt. % benzyl alcohol, based on the overall weight of the polymer, having a number average molecular weight in the range of ≥1,000 g/mol to ≤3,000 g/mol$^{-1}$ as measured by GPC.

In a preferred embodiment, the polyacrylate copolymer backbone that contains moieties derived from a compound of formula (I) is a polyacrylate co-polymer incorporating 7 wt. % benzyl alcohol, based on the overall weight of the polymer, having a number average molecular weight in the range of ≥1,000 g/mol to ≤3,000 g/mol$^{-1}$ as measured by GPC.

In a preferred embodiment, the polyacrylate copolymer backbone that contains moieties derived from a compound of formula (I) is a polyacrylate co-polymer incorporating 6 wt. % benzyl alcohol, based on the overall weight of the polymer, having a number average molecular weight in the range of ≥1,000 g/mol to ≤3,000 g/mol$^{-1}$ as measured by GPC.

In a preferred embodiment, the polyacrylate copolymer backbone that contains moieties derived from a compound of formula (I) is a polyacrylate co-polymer incorporating 5 wt. % benzyl alcohol, based on the overall weight of the polymer, having a number average molecular weight in the range of ≥1,000 g/mol to ≤3,000 g/mol$^{-1}$ as measured by GPC.

In another embodiment, the presently claimed invention is directed to a method of preparing a polymer comprising at least the steps of:

a) polymerizing a mixture comprising at least one acrylate monomer of the general formula (II)

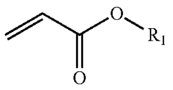

formula (II)

wherein $R_1$ is selected from the group consisting of substituted or unsubstituted, linear or branched $C_1$-$C_{10}$ alkyl or substituted or unsubstituted aryl;

in the presence of at least one free radical forming initiator and the at least one compound of the general formula (I)

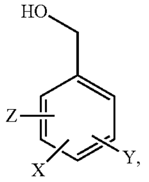

formula (I)

wherein X, Y and Z are independently selected form the group consisting of hydrogen; halogen; substituted or unsubstituted, linear or branched $C_1$-$C_{10}$ alkyl; OR, and C(=O)—OR, wherein R is substituted or unsubstituted, linear or branched $C_1$-$C_{10}$ alkyl.

In an embodiment, the at least one acrylate monomer of the general formula (II) is defined as above.

In another preferred embodiment, the compound of formula (I) is defined as above.

In an embodiment, the polymerization reaction is carried out in the presence of at least one free radical forming initiator.

In a preferred embodiment, the at least one free radical forming initiator is selected from the group consisting of peroxides, azo compounds and per-acid derivatives.

In a preferred embodiment, the at least one radical forming initiator is an azo compound. The representative examples for the radical forming initiator azo compound are 2,2'-azobis (isobutyronitrile), 2,2'-azobis(2,4-dimethylvaleronitrile), 2,2'-azobis (methylbutyronitrile), and 1,1'-azobis (cyanocyclohexane).

In a preferred embodiment, the at least one radical forming initiator is a peroxy compound. The representative examples for the peroxy compound are benzoyl peroxide, lauroyl peroxide, t-butyl peroxypivalate, t-butyl peroctoate, tert-butyl peracetate, tert-amyl perpivalate, per-2-ethylhexanoate, butyl perpivalate tert-butyl perneodecanoate, tert butyl perisononanoate, tert-amyl perbenzoate, tert-butyl peroxydicarbonate, 5-di-2-ethylhexyl peroxydicarbonate, dicyclohexyl perneodecanoate and cumyl tert-butyl permaleate.

In a preferred embodiment, the at least one radical forming initiator is a per-acid derivative preferably selected from the group consisting of persulfates, perborates, persuccinic acids and diisopropyl peroxy dicarbonates.

In another preferred embodiment, the ratio of the at least one compound of general formula (I) to the at least one acrylate monomer of the general formula (II) in the mixture is 10:1 to 1:10, more preferably 8:1 to 1:8, even more preferably 6:1 to 1:6, most preferably 5:1 to 1:5 and in particular 5:2 to 2:5.

In another preferred embodiment, the mixture comprising the at least one acrylate monomer of the general formula (II) is charged to the at least one compound of formula (I) at a temperature in the range of 80° C. to 180° C., more preferably the mixture comprising the at least one acrylate monomer of the general formula (II) is charged to the at least one compound of formula (I) at a temperature in the range of 100° C. to 180° C., even more preferably the mixture comprising the at least one acrylate monomer of the general formula (II) is charged to the at least one compound of formula (I) at a temperature in the range of 100° C. to 160° C., most preferably the mixture comprising the at least one acrylate monomer of the general formula (II) is charged to the at least one compound of formula (I) at a temperature in the range of 100° C. to 150° C., in particular the mixture comprising the at least one acrylate monomer of the general formula (II) is charged to the at least one compound of formula (I) at a temperature in the range of 100° C. to 140° C.

In another preferred embodiment, the mixture comprising the at least one acrylate monomer of the general formula (II) is charged to the compound of formula (II) over a period of 2 to 8 hours, more preferably the mixture comprising the at least one acrylate monomer of the general formula (II) is charged to the compound of formula (II) over a period of 2 to 6 hours, most preferably the mixture comprising the at least one acrylate monomer of the general formula (II) is charged to the compound of formula (II) over a period of 3 to 6 hours.

In another preferred embodiment, the at least one free radical forming initiator is present in an amount of 0.1 wt. % to 5 wt. %, relative to the total weight of the mixture, more preferably the at least one free radical forming initiator is present in an amount of 0.1 wt. % to 4 wt. %, relative to the total weight of the mixture, more preferably the at least one free radical forming initiator is present in an amount of 0.5 wt. % to 3 wt. %, relative to the total weight of the mixture, most preferably the at least one free radical forming initiator is present in an amount of 0.5 wt. % to 2 wt. %, relative to the total weight of the mixture and in particular the at least one free radical forming initiator is present in an amount of 0.5 wt. % to 1 wt. %, relative to the total weight of the mixture.

In a preferred embodiment, the polymerization is carried out in the presence of at least one solvent selected from the group consisting of alcohols, ketones, aromatics, esters, glycol ethers, n-hexane, octane, and dimethyl formamide.

The representative examples for the ester solvents are ethyl acetate, n-butyl acetate and 1-methoxy-2-propyl acetate.

The representative examples for the alcohol solvents are ethanol, 1-propanol, n-butanol n and 1-methoxy-2-propanol.

The representative examples for the aromatic solvents are toluene, xylene and higher-boiling alkylbenzenes.

The representative examples for the ketone solvents are methyl isobutyl ketone and methyl ethyl ketone.

In a preferred embodiment, the at least one compound of the general formula (I) is also used as a solvent. Hence, the polymerization is carried out in the absence of an additional solvent.

In another preferred embodiment, the reaction is carried out over a period between 2 hours to 10 hours, more preferably between 2 to 8 hours, most preferably between 2 to 6 hours, and in particular between 2 to 5 hours.

In another preferred embodiment, the step b) is performed at a temperature in the range from ≥80° C. to ≤180° C., more preferably at a temperature in the range from ≥100° C. to ≤180° C., most preferably at a temperature in the range from ≥100° C. to ≤160° C., and in particular preferably at a temperature in the range from ≥100° C. to ≤140° C.

In a preferred embodiment, the polymer is isolated by distilling off the at least one solvent and/or the compound of the general formula (I).

In another preferred embodiment, the distillation of the mixture is carried out at a temperature in the range from ≥80° C. to ≤180° C., more preferably at a temperature in the range from ≥ 100° C. to ≤180° C., most preferably at a temperature in the range from ≥100° C. to ≤160° C., and in particular at a temperature in the range from ≥100° C. to ≤140° C.

In a preferred embodiment, a mixture comprising n-butyl acrylate and ethyl hexylacrylate in a ratio of 4:1 by weight is reacted in the presence of tert-butyl-peroxy 2-ethylhexylcarbonate (0.5 wt. % related to overall monomer content) and benzyl alcohol at a temperature in the range of 130 to 135° C. over a period of 1-3 hours to obtain a polyacrylate copolymer of n-butylacrylate-ethyl hexylacrylate which covalently incorporated 7 wt. % of benzyl alcohol related to the content of polyacrylate polymer.

In another preferred embodiment, the method comprises at least the steps of polymerizing a mixture comprising n-butyl acrylate, ethyl hexylacrylate and hydroxyethyl acrylate in a ratio of 76:19:5 by weight in the presence of tert-butyl-peroxy 2-ethylhexylcarbonate (0.5 wt. %) and benzyl alcohol at a temperature in the range of 130 to 135° C. over a period of 1-3 hours to obtain a polyacrylate copolymer of n-butyl acrylate-ethyl hexylacrylate-hydroxyethyl acrylate which covalently incorporates 5.1 wt. % of benzyl alcohol.

In another preferred embodiment, the method comprises at least the steps of polymerizing a mixture comprising n-butyl acrylate, ethyl hexylacrylate and hydroxyethyl acrylate in a ratio of 36:9:5 by weight in the presence of tert-butyl-peroxy 2-ethylhexylcarbonate (0.5 wt. %) and benzyl alcohol at a temperature in the range of 130 to 135° C. over a period of 1-3 hours to obtain a polyacrylate copolymer of n-butyl acrylate-ethyl hexylacrylate-hydroxyethyl acrylate which covalently incorporates 5.8 wt. % of benzyl alcohol.

In another preferred embodiment, the method comprises at least the steps of polymerizing a mixture comprising n-butyl acrylate, ethyl hexylacrylate, and hydroxyethyl acrylate in a ratio of 18:15:17 by weight in the presence of tert-butyl-peroxy 2-ethylhexylcarbonate (0.5 wt. %) and benzyl alcohol at a temperature in the range of 130 to 135° C. over a period of 1-3 hours to obtain a polyacrylate copolymer of n-butyl acrylate-ethyl hexylacrylate-hydroxyethyl acrylate which covalently incorporates 9 wt. % of benzyl alcohol.

In another preferred embodiment, the method comprises at least the steps of polymerizing a mixture comprising n-butyl acrylate, ethylhexyl acrylate and acrylic acid in a ratio of 72:18:10 by weight in the presence of tert-butyl-peroxy 2-ethylhexylcarbonate (0.5 wt. %) and the benzyl alcohol at a temperature in the range of 130 to 135° C. over a period of 1-3 hours to obtain a polyacrylate copolymer of n-butyl acrylate-ethyl hexylacrylate-acrylic acid which covalently incorporates 5.8 wt. % of benzyl alcohol.

In another preferred embodiment, the method comprises at least the steps of polymerizing a mixture comprising n-butyl acrylate, ethyl hexylacrylate and styrene in a ratio of 68:17:15 by weight in the presence of tert-butyl-peroxy 2-ethylhexylcarbonate (0.5 wt. %) and benzyl alcohol at a temperature in the range of 130 to 135° C. over a period of 1-3 hours to obtain a polyacrylate copolymer of n-butyl acrylate-ethyl hexylacrylate-styrene which covalently incorporates benzyl alcohol.

In an embodiment, the presently claimed invention is directed to a liquid composition in the form of a dispersion comprising, a polyacrylate polymer incorporated with benzylic alcohol, and a fine particulate solid material selected from the group consisting of pigments and fillers, and a liquid diluent.

In another preferred embodiment, the liquid composition has a weight ratio of the fine particulate solid material to the polyacrylate polymer incorporating benzyl alcohol in the range of 100:1 to 1:50.

In another preferred embodiment, the liquid composition comprises a) ≥1 wt. % to ≤70 wt. % by weight, based on the total weight of the liquid composition, of at least one fine particulate solid material, selected from the group consisting of pigments and fillers;

b) ≥0.5 wt. % to ≤50 wt. % by weight, based on the total weight of the liquid composition, of the acrylate polymer incorporated with benzylic group according to the presently claimed invention or the polymer prepared according to the presently claimed process; and c) ≥10 wt. % to ≤98.5 wt. % by weight, based on the total weight of the liquid composition, of at least one liquid diluent.

In another preferred embodiment, the liquid composition is present in the form of a pigment paste, a mill base, a colorant, a coating composition or an ink.

In an embodiment, the presently claimed invention is directed to the use of the polymer according to the presently claimed invention as an additive in coatings, paints, inks and adhesives.

In another preferred embodiment, the presently claimed invention is directed to the use of the polymer according to the presently claimed invention as a dispersant for fine particulate solid material selected from the group consisting of pigments and fillers.

In another preferred embodiment, the presently claimed invention is directed to the use of the polymer according to the presently claimed invention as flow and levelling agent or surface additive in coatings, paints, inks and adhesives.

In another preferred embodiment, the presently claimed invention is directed to the use of the polymer according to the presently claimed invention as resin component in coatings, paints, inks, and adhesives.

In the following, there is provided a list of embodiments to further illustrate the present disclosure without intending to limit the disclosure to the specific embodiments listed below.

1. A polymer comprising a polyacrylate homo- or copolymer backbone and at least one moiety derived from a compound of the general formula (I)

formula (I)

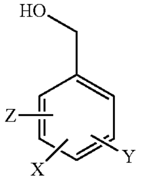

wherein X, Y and Z are independently selected from the group consisting of hydrogen; halogen; substituted or unsubstituted, linear or branched $C_1$-$C_{10}$ alkyl; OR; and C(═O)—OR, wherein R is substituted or unsubstituted, linear or branched $C_1$-$C_{10}$ alkyl, and wherein the at least one moiety derived from the compound of the general formula (I) is covalently bonded to at least one of the ends of the polyacrylate backbone.

2. The polymer according to embodiment 1, wherein the at least one moiety derived from the compound of the general formula (I) is bonded via —C(═O)—O— to the polyacrylate homo or copolymer backbone.

3. The polymer according to embodiment 1, wherein the polyacrylate homopolymer backbone is obtained by polymerizing a mixture comprising at least one acrylate monomer of general formula (II), formula (II)

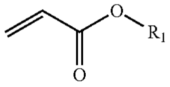

wherein $R_1$ is selected from the group consisting of substituted or unsubstituted, linear or branched $C_1$-$C_{22}$ alkyl or $C_1$-$C_{22}$ cycloalkyl, substituted or unsubstituted aryl, substituted or unsubstituted aralkyl.

4. The polymer according to embodiment 3, wherein $R_1$ is linear or branched $C_1$-$C_{10}$ alkyl or substituted aryl.

5. The polymer according to embodiment 3, wherein the at least one acrylate monomer of general formula (II) is selected from the group consisting of methyl acrylate, ethyl acrylate, 2 hydroxyethyl acrylate, 2-hydroxyisopropyl acrylate, propyl acrylate, n-butyl acrylate, octyl acrylate, isobutyl acrylate, tert-butyl acrylate, 4-hydroxybutyl acrylate, octyl acrylate, 2-ethylhexyl acrylate, 2-methoxyethyl acrylate, 2-ethoxyethyl acrylate, 2-butoxyethyl acrylate, 2-(2-ethoxyethoxy)ethyl acrylate, 2-(2-butoxyethoxy)ethyl acrylate 2-phenoxyethyl acrylate, isobornyl acrylate, isodecyl acrylate, lauryl acrylate, stearyl acrylate, behenyl acrylate, tetrahydrofurfuryl acrylate, isophoryl acrylate, 2-(dimethylamino)ethyl acrylate, 2-(diethylamino)ethyl acrylate, polyethoxylated acrylate, 2-(perfluorohexyl)ethyl acrylate, 2-(perfluoroethyl)ethyl methacrylate, 2-(Perfluorobutyl)ethyl methacrylate, silicone modified acrylates.

6. The polymer according to embodiment 5, wherein the at least one acrylate monomer of general formula (II) is selected from the group consisting of methyl acrylate, ethyl acrylate, propyl acrylate, butyl acrylate, octyl acrylate, and polyethoxylated acrylate.

7. The polymer according to embodiment 1, wherein the polyacrylate copolymer backbone is obtained by polymerizing a mixture comprising at least one acrylate monomer of general formula (II) and at least one ethylenically unsaturated monomer.

8. The polymer according to embodiment 7, wherein the at least one ethylenically unsaturated monomer is selected from the group consisting of (meth)acrylic esters formula (IIIa), acrylamide of formula (IIIb), acrylonitrile, methacrylonitrile, acrylic acid, methacrylic acid, vinylcaprolactam, N-vinylpyrrolidone, N-acryloyl-N'-methylpiperazine, N-acryloyl-N'-ethylpiperazine, N-acryloyl-N'-propylpiperazine, styrene and substituted styrene, α-methylstyrene, vinyl toluene, vinyl esters, vinylidene halides, and α-olefins.

9. The polymer according to embodiment 8, wherein the (meth)acrylic esters formula (IIIa) is Formula (IIIa)

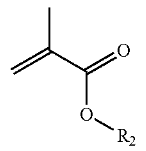

wherein $R_2$ is selected from the group consisting of substituted or unsubstituted, linear or branched $C_1$-$C_{22}$ alkyl, substituted or unsubstituted aryl.

10. The polymer according to embodiment 9, wherein at least one methacrylate monomer is selected from the group consisting of 2-(perfluorohexyl)ethyl methacrylate, 2-(perfluoroethyl) ethyl methacrylate and 2-(Perfluorobutyl)ethyl methacrylate.

11. The polymer according to embodiment 9, wherein at least one methacrylate monomer is a silicone modified methacrylate.

12. The polymer according to embodiment 9, wherein the at least one acrylate monomer is a terminal reactive polydimethysiloxane methacrylate macromonomer.

13. The polymer according to embodiment 8, wherein the (meth)acrylamide of formula (IIIb) is Formula (IIIb)

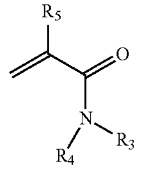

wherein $R_3$, $R_4$ and $R_5$ are independently selected from the group consisting of hydrogen, substituted or unsubstituted, linear or branched $C_1$-$C_{22}$ alkyl and substituted or unsubstituted aryl.

14. The polymer according to embodiment 1, wherein the compound of the general formula (I) is selected form the group consisting of benzyl alcohol, o-tolylmethanol, m-tolylmethanol, p-tolylmethanol, (2,4-dimethylphenyl) methanol, (3,4-dimethylphenyl)methanol, (2,3-dimethylphenyl)methanol, (2,6-dimethylphenyl)methanol, [4-(hydroxymethyl)phenyl]methanol, [3-(hydroxymethyl)phenyl] methanol, [2-(hydroxymethyl)phenyl]methanol, (3-chlorophenyl)methanol, (4-chlorophenyl)methanol, (2-chlorophenyl)methanol, (3,5-dichlorophenyl)methanol, (2,3-dichlorophenyl)methanol, (3,6-dichlorophenyl)methanol, (4,5-dichlorophenyl)methanol, (2,6-dichlorophenyl) methanol, (3-chloro-5-methoxy-phenyl)methanol, (2-chloro-5-methoxy-phenyl)methanol, (3-chloro-4-methoxy-phenyl)methanol, (4-chloro-2-methoxy-phenyl) methanol, (3-methoxyphenyl)methanol, (2-methoxyphenyl) methanol, (4-methoxyphenyl)methanol, (2,3-dimethoxyphenyl)methanol, (2,4-dimethoxyphenyl)methanol, (2,5-dimethoxyphenyl)methanol, (2,6-dimethoxyphenyl) methanol, (3,4-dimethoxyphenyl)methanol, (3,5-dimethoxyphenyl)methanol and (3,6-dimethoxyphenyl)methanol.

15. The polymer according to embodiment 14, wherein the compound of the general formula (I) is selected from the group consisting of benzyl alcohol, o-tolylmethanol, p-tolylmethanol, [3-(hydroxymethyl)phenyl]methanol, (2-methoxyphenyl)methanol, and (4 methoxyphenyl)methanol.

16. The polymer according to embodiment 1, wherein the at least one moiety that is derived from a compound of the general formula (I) is present in an amount in the range from ≥1.5 wt. % to ≤30 wt. %, based on the overall weight of the polymer.

17. The polymer according to embodiment 1, wherein the at least one moiety that is derived from a compound of the general formula (I) is present in an amount in the range from ≥2 wt. % to ≤10 wt. %, based on the overall weight of the polymer.

18. The polymer according to embodiment 1, wherein the polymer has a number average molecular weight $M_n$ in the range from ≥500 $gmol^{-1}$ to ≤100,000 $gmol^{-1}$ as measured by GPC.

19. The polymer according to embodiment 1, wherein the polymer has a number average molecular weight $M_n$ in the range from ≥500 $gmol^{-1}$ to ≤60,000 $gmol^{-1}$ as measured by GPC.

20. A method of preparing a polymer according to one or more of embodiments 1 to 19 comprising at least the steps of:

a) polymerizing a mixture comprising at least one acrylate monomer of the general formula (II)

formula (II)

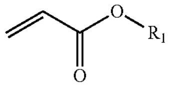

wherein $R_1$ is selected from the group consisting of substituted or unsubstituted, linear or branched $C_1$-$C_{22}$ alkyl, substituted or unsubstituted aryl.

in the presence of at least one free radical forming initiator and the at least one compound of the general formula (I)

formula (I)

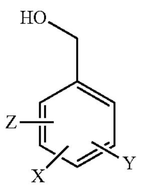

wherein X, Y and Z are independently selected form the group consisting of hydrogen; halogen; substituted or unsubstituted, linear or branched $C_1$-$C_{10}$ alkyl; OR, and C(=O)—OR, wherein R is substituted or unsubstituted, linear or branched $C_1$-$C_{10}$ alkyl.

21. The method according to embodiment 20, wherein the at least one acrylate monomer of the general formula (II) is present in an amount in the range from ≥40 wt. % to ≤80 wt. %, based on the total weight of the mixture.

22. The method according to embodiment 20, wherein the mixture comprising the at least one acrylate monomer of the general formula (II) is charged to the at least one compound of formula (I) at a temperature in the range of 80° C. to 180° C.

23. The method according to embodiment 20, wherein the mixture comprising the at least one acrylate monomer of the general formula (II) is charged to the compound of formula (II) over a period of 2 to 8 hours.

24. The method according to embodiment 20, wherein the at least one free radical forming initiator is present in an amount of 0.1 wt. % to 5 wt. %, relative to the total weight of the mixture.

25. The method according to embodiment 20, wherein the at least one free radical forming initiator is selected from the group consisting of peroxides, azo compounds and peracid derivatives.

26. The method according to embodiment 25, wherein the peroxide is selected from the group consisting of hydrogen peroxide, dibenzoyl peroxide, dicumyl peroxide, t-butyl peroxypivalate, t-butyl peroxy-2-ethylhexanoate, t-butyl peroxybenzoate, acetyl peroxide, benzoyl hydroperoxide, t-butyl hydroperoxide, di-t-butyl peroxide, lauryl peroxide, butyryl peroxide, tert-butyl per-oxy-2-ethylhexyl carbonate, tert-amyl peroxy-2-ethylhexyl carbonate and 1,1-di-(tert-butylperoxy)-3,3,5-trimethylcyclohexane.

27. The method according to embodiment 25, wherein the azo compound is azobisisobutyronitrile.

28. The method according to embodiment 25, wherein the per-acid derivatives are selected from the group consisting dibenzoyl peroxide, dicumyl peroxide, t-butyl peroxypivalate, t-butyl peroxy-2-ethylhexanoate, t-butyl peroxybenzoate.

29. The method according to embodiment 20, wherein the polymerization is carried out in the presence of at least one solvent selected from the group consisting of alcohols, ketones, aromatics, acetates, glycol ethers, n-hexane, octane, and dimethyl formamide.

30. The method according to embodiment 20, wherein the ratio of the compound of the general formula (I) to the at least one acrylate monomer of general formula (II) is in the range of 1:10 to 10:1.

31. The method according to embodiment 20, wherein the reaction is carried out over a period between 2 hours to 10 hours.

32. The method according to embodiment 20, further comprising step b) of isolating the polymer by distilling off the at least one solvent and/or the compound of the general formula (I).

33. The method according to embodiment 32, wherein step b) is performed at a temperature in the range from ≥80° C. to ≤180° C.

34. A liquid composition in the form of a dispersion comprising, the polymer according to one or more of the embodiments 1 to 19 or the polymer obtained according to the process of one or more of embodiments 20 to 33, and a fine particulate solid material selected from the group consisting of pigments and fillers, and a liquid diluent.

35. The liquid composition according to embodiment 34, wherein the weight ratio of the fine particulate solid material to the polymer is in the range of 100:1 to 1:50.

36. The liquid composition according to embodiment 34 or 35 comprising a) ≥1 wt. % to ≤70 wt. % by weight, based on the total weight of the liquid composition, of at least one fine particulate solid material, selected from the group consisting of pigments and fillers;

b) ≥0.5 wt. % to ≤50 wt. % by weight, based on the total weight of the liquid composition, of the polymer according to one or more of embodiments 1 to 19 or the polymer obtained according to the process of one or more of embodiments 20 to 33; and c) ≥10 wt. % to ≤98.5 wt. % by weight, based on the total weight of the liquid composition, of at least one liquid diluent.

37. The liquid composition according one or more of embodiments 34 to 36, wherein the liquid composition is in the form of a pigment paste, a mill base, a colorant, a coating composition or an ink.

38. Use of the polymer according to one or more of embodiments 1 to 19 or a polymer obtained according to the process of one or more of embodiments 20 to 33, as an additive in coatings, paints, inks and adhesives.

39. Use of the polymer according to one or more of embodiments 1 to 19 or a polymer obtained according to the process of one or more of embodiments 20 to 33, as a dispersant for fine particulate solid material selected from the group consisting of pigments and fillers.

40. Use of the polymer according to one or more of embodiments 1 to 19 or a polymer obtained according to the process of one or more of embodiments 20 to 33, as flow and levelling agent or surface additive in coatings, paints, inks and adhesives.

41. Use of the polymer according one or more of embodiments 1 to 19 or a polymer obtained according to the process of one or more of embodiments 20 to 33, as resin component in coatings, paints, inks, and adhesives.

While the presently claimed invention has been described in terms of its specific embodiments, certain modifications and equivalents will be apparent to those skilled in the art and are intended to be included within the scope of the presently claimed invention

EXAMPLES

The presently claimed invention is illustrated in detail by non-restrictive working examples which follow. More particularly, the test methods specified hereinafter are part of the general disclosure of the application and are not restricted to the specific working examples.

Material n-butyl acrylate (nBA)
2-ethylhexyl acrylate (EHA)
2-hydroxyethyl acrylate (HEA)
acrylic acid (AA), and
styrene (SY)
are commercially available from BASF SE.

Benzyl alcohol is available from Sigma Aldrich.
Solvesso@ 100 is available from Bernd Kraft.

Physical Methods

Method of determination the content of the aromatic moiety: $^1$H NMR spectroscopy, gravimetric analysis Method of determining $M_w$, $M_n$ and PDI: Gel permeation chromatography (polystyrene standard)

General Procedure to Prepare the Polymer

The solvent benzyl alcohol was pre-charged into the reactor and heated to 100 to 150° C. The monomer mixture was dosed over a period of 1 to 5 hours. The addition of the free radical initiator was started simultaneously to the monomer feed(s), however charged over a period of 2 to 5 hours. The total amount of solvent relative to the amounts of monomers and initiator was in the range of 30% and 80%, depending mainly on the targeted molecular weight of the polymer. After stirring the mixture for another 1 to 10 hour(s) at 120 to 150° C., the solvent was distilled off and the polymer was isolated with a solid content of 97-100%.

TABLE 1

Polymers with different monomer compositions obtained according to the claimed polymerization process by using 0.5 wt. % tert-butyl-(2-ethylhexyl) peroxycarbonate.

| Example | Monomer composition | Ratio of monomer composition [by wt. %][a] | Amount of benzyl alcohol incorporated into the polymer [by wt. %][b] | $M_n$ [g/mol][c] | $M_w$ [g/mol][c] | PDI[c] |
|---|---|---|---|---|---|---|
| 1 | nBA/EHA | 80/20 | 7.0 | 2300 | 4700 | 2.0 |
| 2 | nBA/EHA/HEA | 76/19/5 | 5.1 | 2400 | 5400 | 2.3 |
| 3 | nBA/EHA/HEA | 72/18/10 | 5.8 | 2300 | 5400 | 2.3 |
| 4 | nBA/EHA/HEA | 36/30/34 | 9.0 | 1600 | 3100 | 2.0 |
| 5 | nBA/EHA/AA | 72/18/10 | 5.8 | 2000 | 4700 | 2.4 |

[a]Amount of monomers weighed into the monomer feed of the reaction
[b]Determined by $^1$H NMR
[c]Determined by GPC in THE relative to polystyrene standard Detailed analysis of NMR spectra revealed that benzyl alcohol is incorporated at the terminal end of the polymer chain by radical transfer reaction and in small amounts via ester linkage. The total amount of benzyl alcohol incorporated into the polymer depends on the reaction conditions during the polymerization as well as during the distillation process.

The use of the acrylic polymers as a levelling agent was tested. The difference in application properties of the polymer prepared according to the presently claimed invention was compared with a polymer with the same or a similar chemical structure as well as the same or a similar molecular weight and molecular weight distribution which was obtained via a state-of-the-art, free radical solution polymerization and also with a commercially available product, which is considered as a benchmark. It was found that the formulation containing the presently claimed product showed similar or better levelling performance and a much better colour index compared to the polymer obtained via the state-of-the-art, free radical solution polymerization or the commercially available product. The comparison is summarised in Table 2. It can be inferred from the Table 2 that the inventive acrylate polymers incorporating benzylic alcohol show reduced discoloration according to the measured Hazen number compared to the corresponding polymers prepared via the state-of-the-art, free radical solution polymerization in the technical aromatic hydrocarbon solvent Solvesso® 100.

TABLE 2

Polymers with different monomer compositions synthesized in either benzyl alcohol according to the inventively claimed polymerization process or in a standard solvent for free radical polymerizations (aromatic hydrocarbon solvent Solvesso® 100).

| Example | Monomer composition | Ratio of monomer composition [by weight] | Solvent for polymerization | Number average molecular weight Mb | Weight average molecular weight MW | PDIb | Color index [Hazen 0-1000] |
|---|---|---|---|---|---|---|---|
| 1 | nBA/EHA | 80/20 | Benzyl alcohol | 2300 | 4700 | 2.0 | 26 |
| 8* | nBA/EHA | 80/20 | Solvesso ® 100 | 2300 | 4500 | 1.9 | 105 |
| 2 | nBA/EHA/HEA | 76/19/5 | Benzyl alcohol | 2400 | 5400 | 2.3 | 13 |
| 10* | nBA/EHA/HEA | 76/19/5 | Solvesso ® 100 | 2500 | 5900 | 2.4 | 84 |
| 3 | nBA/EHA/HEA | 72/18/10 | Benzyl alcohol | 2300 | 5400 | 2.3 | 12 |
| 12* | nBA/EHA/HEA | 72/18/10 | Solvesso ® 100 | 2600 | 5900 | 2.3 | 86 |
| 5 | nBA/EHA/AA | 72/18/10 | Benzyl alcohol | 2000 | 4700 | 2.4 | 61 |
| 14* | nBA/EHA/AA | 72/18/10 | Solvesso ® 100 | 2100 | 5000 | 2.4 | 239 |
| 15 | nBA/EHA/Sty | 68/17/15 | Benzyl alcohol | 2300 | 5800 | 2.6 | 24 |
| 16* | nBA/EHA/Sty | 68/17/15 | Solvesso ®100 | 2600 | 6500 | 2.5 | 65 |

*not within the scope of the presently claimed invention

[a]Amount of monomers weighed into the monomer feed of the reaction. The polymerizations in benzyl alcohol were performed with 0.5 wt. % initiator tert-butyl-(2-ethylhexyl) peroxycarbonate.
The polymerizations in Solvesso ® 100 were performed with initiator tert-butyl-(2-ethylhexyl) peroxycarbonate, using 3 wt. % (entry 2, entry 8), 2 wt. % (entry 4, entry 6) or 4 wt. % (entry 10).

[b]Determined by GPC using THF as an eluent.

The inventive acrylate polymers (example 1) incorporating the benzylic alcohol were tested for their use as levelling agents in a standard 2K PU solvent based clearcoat with an addition level of 1 wt. % (0.1 wt. % Byk 310 & 0.9 wt. % additive (Byk 361N or Example 1)). Tables 3 (stock solution) and 4 (hardener solution) display the test formulation of a stock solution and a hardener:

TABLE 3

Stock solution

| Raw material | Supplier | Chemical compound | Quantity |
|---|---|---|---|
| Joncryl ® 507 | BASF SE | Acrylic Polyol | 280.00 |
| Polyester HPE 108 | | Hyperbranched Polyester | 93.10 |
| Efka ® PX 4310 | BASF SE | Acrylic Blockcopolymer CFRP | 33.60 |
| Efka ® SI 2040 | BASF SE | Solvent Solution with silicone | 1.40 |
| n-butyl acetate | BASF SE | Ester Solvent | 147.00 |
| Xylene | BASF SE | Aromatic Solvent | 112.00 |
| DBTL (1% in n-butyl acetate) | Alfa Aesar | Dibutyltin dilaurate | 9.10 |
| Colour Black FW 171 | Orion Engineered Carbons | High Colour Furnace black | 23.80 |
| Total | | | 700.00 |

TABLE 4

Hardener

| Raw material | Supplier | Chemical compound | Quantity |
|---|---|---|---|
| Basonat ® HI 2000 | BASF SE | Isocyanate | 64.00 |
| n-butyl acetate | BASF SE | Ester Solvent | 15.00 |

TABLE 4-continued

Hardener

| Raw material | Supplier | Chemical compound | Quantity |
|---|---|---|---|
| MPA (methoxypropyl acetate) | BASF SE | Ester Solvent | 15.00 |
| BGA (butylglycol acetate) | BASF SE | Ester Solvent | 6.00 |
| Total | | | 100.00 |

The stock solution and hardener solution were mixed in a ratio of 3:1.

The DIN 4 cup viscosity was found to be in the range of 25-30 s.

Application: Fliessbecher Manuell Needle ca. 1, 3 mm app. 40-50 μm.

Drying: 10 min RT; 30 min 100° C.

After cooling the performance was evaluated via measuring the wetting limit.

During spray application paints droplets were formed that impact the substrate to be coated. Only if a suitable wetting and levelling package was available the droplets fused to a thin, defect free coating film. The lower the wetting limit the earlier such a defect free coating was formed and the lower was the amount of coating material needed to protect the substrate.

TABLE 5

| Additiv (0.1%/0.9%) | Wetting Limit [μm] |
|---|---|
| Blank | 11 |
| Byk ® 310/Byk ® 361N | 6 |
| Byk ® 310/example 1 | 4 |

The result demonstrates that the inventive polymer of example 1 enables a defect free film already at a smaller film thickness of 4 μm, whereas the reference additive would need a thicker film of 6 μm.

In addition, the additives were tested at 1 wt. % in a coil coating system according to the formulation below (0.1 wt. % Byk 310 & 0.9 wt. % additive):

TABLE 6

| Raw Material | Supplier | Amount |
|---|---|---|
| Dynapol ® LH 832-02 | Evonik | 78.9 |
| Cymel ® 303 | Allnex | 10.3 |
| Nacure ® 2558 | King Industries | 0.2 |
| Butyl Glycol | BASF SE | 2.7 |
| Solvesso ® 150 | BASF SE | 7.9 |
| Formulation | | 100 |

The formulation was applied with a wire bar and cured for 15 seconds at 230° C. in a coil oven.

After cooling, the performance was evaluated via measuring the levelling with a Byk Wave Scan.

TABLE 7

| Additive (0.1%/0.9%) | du dullness | Long wave | Short wave | DOI (Dorigon) | Gloss (20° ow) | Haze (ow) |
|---|---|---|---|---|---|---|
| Blank | 54.4 | 34.8 | 26.2 | 66 | 73 | 233 |
| Byk 310/Byk 361N | 54.3 | 3.1 | 19.9 | 66.5 | 68 | 223 |
| Byk 310/Expt. ID 1 | 52.9 | 3.1 | 21.1 | 67.4 | 74 | 180 |

Lower Shortwave and Longwave values are an indication for a better levelling performance. Comparing the blank sample (LW 34.8) with the two blends (Byk 310 with Byk 361N or Example 1) (LW 3.1) a strong and comparable improvement is observed. The two blends performed equally well with respect to the smoothness of the surface as measured by longwave and shortwave, but the inventive additive of example 1 results in higher gloss and lower haze. Overall the inventive additive of polymer 1 enables an improved appearance of the cured coating One general advantage of the polyacrylate polymer incorporating benzylic alcohol resides in its low discoloration, which combines with excellent properties as a flow and levelling agent, or as a dispersant.

The invention claimed is:

1. A polymer comprising a polyacrylate homo- or copolymer backbone and at least one moiety derived from a compound of the general formula (I)

formula (I)

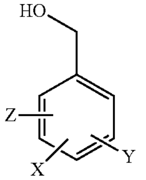

wherein X, Y and Z are independently selected from the group consisting of hydrogen; halogen; substituted or unsubstituted, linear or branched $C_1$-$C_{10}$ alkyl; OR; and C(═O)—OR, wherein R is substituted or unsubstituted, linear or branched $C_1$-$C_{10}$ alkyl, wherein the at least one moiety derived from the compound of the general formula (I) is covalently bonded to at least one of the ends of the polyacrylate backbone;

wherein the at least one moiety that is derived from a compound of the general formula (I) is present in an amount in the range from ≥3 wt. % to ≤10 wt. %, based on the overall weight of the polymer; and wherein the polyacrylate homo- or co-polymer backbone is obtained by polymerizing a mixture comprising at least one acrylate monomer of general formula (II), formula (II)

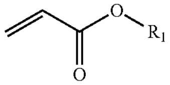

wherein $R_1$ is selected from the group consisting of substituted or unsubstituted, linear or branched $C_1$-$C_{22}$ alkyl or $C_1$-$C_{22}$ cycloalkyl, substituted or unsubstituted aryl, substituted or unsubstituted aralkyl.

2. A liquid composition in the form of a dispersion comprising: the polymer according to claim 1 and a fine particulate solid material selected from the group consisting of pigments and fillers, and a liquid diluent.

3. The liquid composition according to claim 2, comprising, a) ≥1 wt. % to ≤70 wt. % by weight, based on the total weight of the liquid composition, of at least one fine particulate solid material, selected from the group consisting of pigments and fillers;

b) ≥0.5 wt. % to ≤50 wt. % by weight, based on the total weight of the liquid composition, of the polymer; and c) ≥10 wt. % to ≤98.5 wt. % by weight, based on the total weight of the liquid composition, of at least one liquid diluent.

4. A method comprising incorporating an additive comprising the polymer according to claim 1 into a coating, paint, or ink.

5. The method according to claim 4, wherein the at least one moiety derived from the compound of the general formula (I) is bonded via —C(═O)—O— to the polyacrylate homo- or copolymer backbone.

6. The method according to claim 4, wherein the compound of the general formula (I) is selected form the group consisting of benzyl alcohol, o-tolylmethanol, m-tolylmethanol, p-tolylmethanol, (2,4-dimethylphenyl)methanol, (3,4-dimethylphenyl)methanol, (2,3-dimethylphenyl)methanol, (2,6-dimethylphenyl)methanol, [4-(hydroxymethyl)phenyl]methanol, [3-(hydroxymethyl)phenyl]methanol, [2-(hydroxymethyl)phenyl]methanol, (3-chlorophenyl)

methanol, (4-chlorophenyl)methanol, (2-chlorophenyl)methanol, (3,5-dichlorophenyl)methanol, (2,3-dichlorophenyl)methanol, (3,6-dichlorophenyl)methanol, (4,5-dichlorophenyl)methanol, (2,6-dichlorophenyl)methanol, (3-chloro-5-methoxy-phenyl)methanol, (2-chloro-5-methoxy-phenyl)methanol, (3-chloro-4-methoxy-phenyl)methanol, (4-chloro-2-methoxy-phenyl)methanol, (3-methoxyphenyl)methanol, (2-methoxyphenyl)methanol, (4-methoxyphenyl)methanol, (2,3-dimethoxyphenyl)methanol, (2,4-dimethoxyphenyl)methanol, (2,5-dimethoxyphenyl)methanol, (2,6-dimethoxyphenyl)methanol, (3,4-dimethoxyphenyl)methanol, (3,5-dimethoxyphenyl)methanol and (3,6-dimethoxyphenyl)methanol.

7. The method according to claim 4, wherein the polymer has a number average molecular weight $M_n$ in the range from ≥500 $gmol^{-1}$ to ≤30,000 $gmol^{-1}$ as measured by gel permeation chromatography.

8. The method according to claim 4, wherein the polymer is prepared by a method comprising at least the steps of:

a) polymerizing a mixture comprising at least one acrylate monomer of the general formula (II)

formula (II)

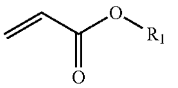

wherein $R_1$ is selected from the group consisting of substituted or unsubstituted, linear or branched $C_1$-$C_{22}$ alkyl, substituted or unsubstituted aryl;

in the presence of at least one free radical forming initiator and the at least one compound of the general formula (I)

formula (I)

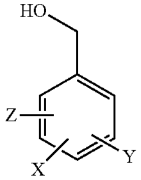

wherein X, Y and Z are independently selected form the group consisting of hydrogen; halogen; substituted or unsubstituted, linear or branched $C_1$-$C_{10}$ alkyl; OR, and C(═O)—OR, wherein R is substituted or unsubstituted, linear or branched $C_1$-$C_{10}$ alkyl.

9. The method according to claim 8, wherein the at least one acrylate monomer of the general formula (II) is present in an amount in the range from ≥40 wt. % to ≤80 wt. %, based on the total weight of the mixture.

10. The method according to claim 8, wherein the mixture comprising the at least one acrylate monomer of the general formula (II) is charged to the at least one compound of formula (I) at a temperature in the range of 100° C. to 150° C.

11. The method according to claim 8, wherein the mixture comprising the at least one acrylate monomer of the general formula (II) is charged to the compound of formula (I) over a period of 2 to 8 hours.

12. The method according to claim 8, wherein the at least one free radical forming initiator is selected from the group consisting of peroxides, azo compounds and peracid derivatives.

13. The method according to claim 8, wherein the mixture is stirred for 1 to 10 hour(s) at 120° C. to 150° C.

14. The method according to claim 8, further comprising step b) of isolating the polymer by distilling off the at least one solvent and/or the compound of the general formula (I).

15. The method according to claim 14, wherein step b) is performed at a temperature in the range from ≥80° C. to ≤180° C.

16. The method according to claim 8, wherein the at least one acrylate monomer of general formula (II) is selected from the group consisting of methyl acrylate, ethyl acrylate, 2 hydroxyethyl acrylate, 2-hydroxyisopropyl acrylate, propyl acrylate, n-butyl acrylate, octyl acrylate, isobutyl acrylate, tert-butyl acrylate, 4-hydroxybutyl acrylate, octyl acrylate, 2-ethylhexyl acrylate, 2-methoxyethyl acrylate, 2-ethoxyethyl acrylate, 2-butoxyethyl acrylate, 2-(2-ethoxyethoxy)ethyl acrylate, 2-(2-butoxyethoxy)ethyl acrylate, 2-phenoxyethyl acrylate, isobomnyl acrylate, isodecyl acrylate, lauryl acrylate, stearyl acrylate, behenyl acrylate, tetrahydrofurfuryl acrylate, isophoryl acrylate, 2-(dimethylamino)ethyl acrylate, 2-(diethylamino)ethyl acrylate and polyethoxylated acrylate.

17. The method according to claim 4, wherein the polyacrylate homo- or copolymer backbone is obtained by polymerizing a monomer mixture comprising at least 66 wt. % of n-butyl acrylate and 2-ethylhexyl acrylate, based on the total weight of the monomer mixture.

18. A method comprising incorporating a dispersant comprising the polymer according to claim 1 into a liquid formulation containing fine particulate solid material, wherein the fine particular solid material is selected from the group consisting of pigments and fillers.

19. The method according to claim 18, wherein the liquid formulation comprises:

a) ≥1 wt. % to ≤70 wt. % by weight, based on the total weight of the liquid composition, of at least one fine particulate solid material, selected from the group consisting of pigments and fillers;

b) ≥0.5 wt. % to ≤50 wt. % by weight, based on the total weight of the liquid composition, of the polymer; and c) ≥10 wt. % to ≤98.5 wt. % by weight, based on the total weight of the liquid composition, of at least one liquid diluent.

20. A method comprising incorporating a flow and levelling agent or surface additive comprising the polymer according to claim 1 into a coating, paint, or ink.

21. A method comprising incorporating a resin comprising the polymer according claim 1 into a coating, paint, ink, or ink.

* * * * *